United States Patent [19]

Bodmann et al.

[11] Patent Number: 4,816,212

[45] Date of Patent: Mar. 28, 1989

[54] GRAPHITE SIDE REFLECTOR

[75] Inventors: Erik Bodmann, Mannheim; Ralf Denninghoff, Viernheim; Anton Schmidt, Weinheim, all of Fed. Rep. of Germany

[73] Assignee: Hochtemperatur-Reaktorbau GmbH, Fed. Rep. of Germany

[21] Appl. No.: 5,583

[22] Filed: Jan. 21, 1987

[30] Foreign Application Priority Data

Jan. 22, 1986 [DE] Fed. Rep. of Germany ....... 3601749

[51] Int. Cl.$^4$ .......................................... G21C 11/06
[52] U.S. Cl. .................... 376/381; 376/458; 376/459
[58] Field of Search ............... 376/203, 204, 337, 338, 376/285, 381, 383, 458, 459

[56] References Cited

U.S. PATENT DOCUMENTS

| 1,130,324 | 3/1915 | Owen | 376/459 |
| 3,977,439 | 8/1976 | Lambert | 376/203 |
| 4,199,405 | 4/1980 | Schweiger | 376/458 |
| 4,642,214 | 2/1987 | Zhong | 376/381 |

FOREIGN PATENT DOCUMENTS 3345113 6/1985 Fed. Rep. of Germany .

Primary Examiner—Deborah L. Kyle
Assistant Examiner—Richard L. Klein
Attorney, Agent, or Firm—Robert J. Koch

[57] ABSTRACT

A high temperature reactor having a reactor core filled with spherical fuel elements is provided comprising a graphite side reflector including at least one nose-like projection protruding radially into the reactor core from said graphite said reflector, said at least one nose-like projection including a vertically disposed cavity adapted to receive discrete absorber material elements introduced into said reactor core as well as a vertically disposed continuous opening which permits communication between said cavity and the core of the reactor, and sealing means positioned in said continuous opening and cooperatively engaged with the portion of said nose-like projections defining said vertically disposed continuous opening, said sealing means being so configured and so cooperatively engaged so as to permit gaseous communication between said cavity and said core while preventing passage of said discrete absorber material elements through said continuous passage.

17 Claims, 3 Drawing Sheets

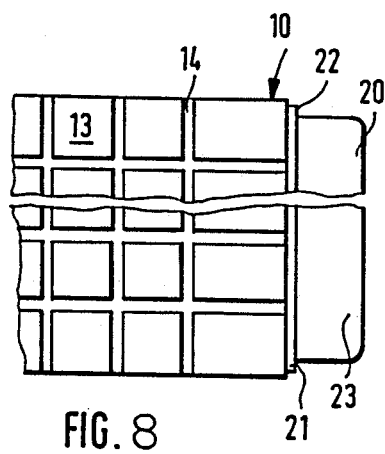 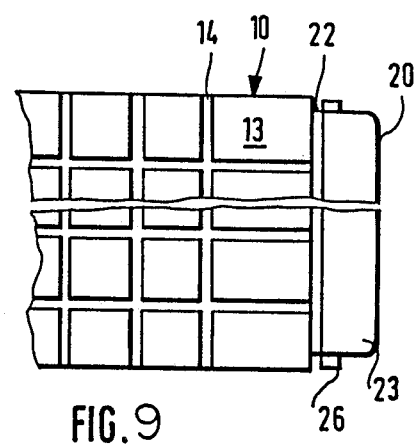

GRAPHITE SIDE REFLECTOR

BACKGROUND OF THE PRESENT INVENTION

The present invention concerns a graphte side reflector in block construction for use in a gas-cooled high temperature reactor with a reactor core filled with spherical fuel elements with nose-like projections, the so-called nose stones, formed by graphite blocks, protruding radially into the reactor core, comprising regularly spaced slit-like recesses arranged in a grid pattern on their inside surface and a continuous gap on their frontal side, whereby the reactor core is connected with a cavity located vertically in the nose stone and serving to receive the absorber material.

The purpose of reflectors in nuclear reactors is to prevent losses due to the outward migration of neutrons. As indicated by the name, at least part of the neutrons moving to the outside are to be reflected back into the fission zone of the reactor, the so-called reactor core. The term "side reflector" designates the laterally placed reflector in contrast to the bottom and top reflector.

The material used for the reflectors in gas-cooled high temperature nuclear reactors comprises high purity graphite, which under neutron irradiation undergoes a change of its crystalline structure, manifested by volume and mechanical property variations.

Under the effect of temperature and high neutron fluxes, initially negative expansion appears in graphite, which, however, beginning at a point of reversal turn into positive expansion eventually exceeding the original dimensions. Differences in expansion within the part generate residual stresses as the result of differential flux and temperature distributions over its cross-section. In order to keep these residual stresses within allowable limits, free expansion must be made possible. This may be obtained advantageously by slit surface structures.

Recent developments in gas-cooled high temperature nuclear reactors, particularly those of low capacity (approximately 100 MWel) and corresponding small diameters, provide for the shutdown of the reactor in place of absorber rods inserted directly into the pile of spherical fuel elements, small absorber balls introduced into the corresponding cavities of the side reflectors. For this purpose, so-called nose stones are placed into the core. They include continuous vertical cavities to receiv the shutdown absorber balls. The nose stones are brick-shaped graphite blocks, physically bonded to the side reflector from which they are radially protruding into the reactor core while extending over the entire height of the latter.

Because of the afore-mentioned volume changes and the residual stress states created thereby in the irradiated graphite blocks, the surfaces on the core side of the latter are provided with vertical and horizontal surface slits, representing the resolution of the original large surface into small individual segments.

To control stresses in the nose stone, the cavities provided for the containment of the small absorber balls are connected by means of narrow, gap-like continuous openings with the core. Stresses in the nose stones are thereby reduced to a tolerable level. The afore-mentioned expansions (the so-called Wigner expansions) lead, however, in the course of the operation to variations of the gap width of a magnitude such that the separation of the absorber material and the fuel elements is no longer assured and small absorber balls may exit from the cavities, while fuel elements can enter them.

Based on this state of the art, it is the object of the invention to propose a design solution that may be manufactured simply and cost effectively, while avoiding the afore-mentioned difficulties.

SUMMARY OF THE PRESENT INVENTION

In accordance with the present invention, it is proposed to place closure means into the gap-like continuous opening, which is cooperatively engaged with the nose stone and prevents the passage of absorber material and fuel elements as well as the intermixing of same.

According to the present invention, a positive anchoring means of the closure means in the nose stone is employed, in order to assure the continuation of the initial purpose of reducing stresses by making free expansion possible. It is advantageous to provide double, i.e., opposing tongue and groove, joints.

Alternatively, in place of a double tongue and groove connection, dove-tail connection may be provided.

In the case of all of the positive connections between the nose stone and the closure part, volume changes caused by the neutron flux must be taken into account.

According to a further advantageous embodiment of the invention, the frontal surface of the nose stone is covered in a cap-like manner by the closure means. The spherical fuel elements present in the reactor core urge the closure means against the nose stone, thereby preventing an unintentional variation of the position of the closure means, potentially capable of interfering with the operation of the reactor. Simultaneously, the creation of a large gap between the elongated hole and the core is prevented, through which in the case of differential pressures large flows of gas could be passed, said gap when acting as a bypass and potentially leading to problems during mixing. The connecting part acts as an automatic sealing means both in the case of a higher pressure in the elongated hole and of overpressure in the core.

BRIEF DESCRIPTION OF THE DRAWINGS

Each of FIGS. 2 to 7, described below, shows a longitudinal section through the frontal part of a nose stone cooperatively engaged with the nose stone, but with a different (nose stones) configuration of its anchoring in the nose stone.

FIG. 8 shows a lateral elevation of the nose stone with a closure part inserted; and FIG. 9 shows a lateral elevation of the nose stone with a closure part comprising a supporting cam inserted.

DETAILED DESCRIPTION OF THE PRESENT INVENTION

The invention is described and explained in more detail in the discussion presented below with reference to the drawings.

Figure 1:
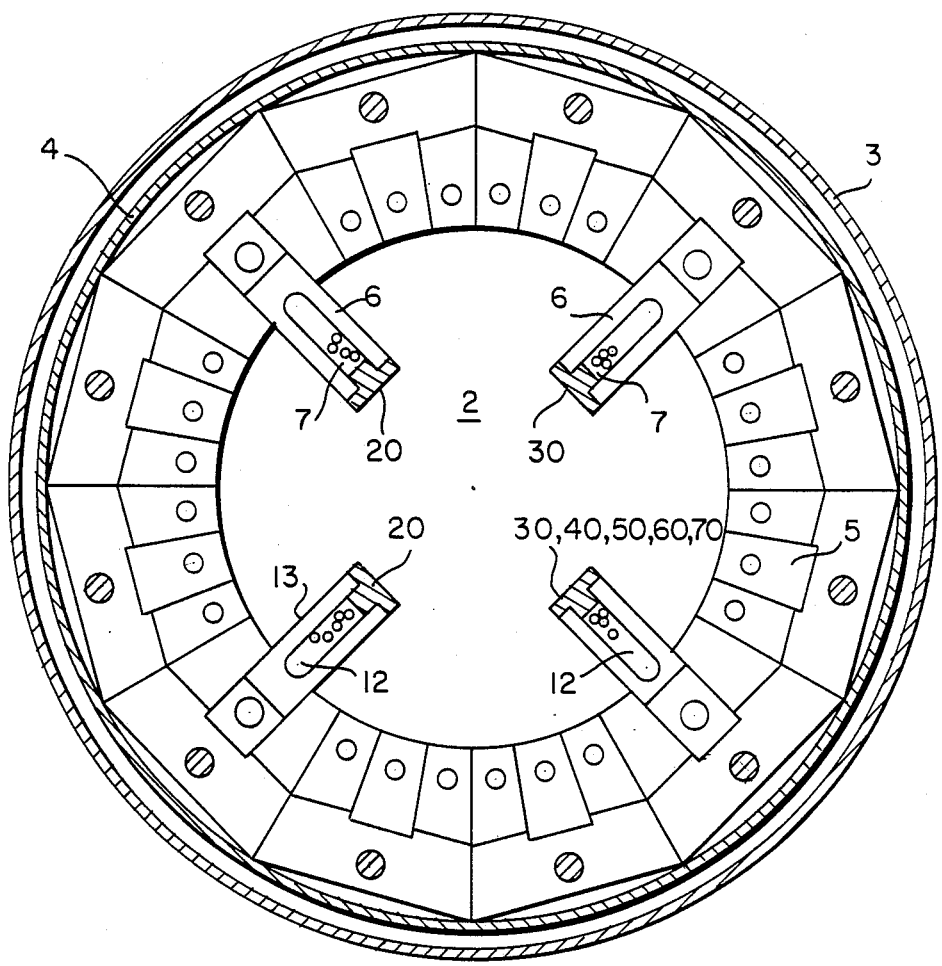
FIG. 1 shows a reactor core having nose-like projections in accordance with the present invention.

FIG. 1 depicts a cross-section through a core 2, bordered by a circular cylindrical reactor pressure vessel 3 and a thermal side shield 4, connected with ceramic installations serving as the side reflector 5, and into which four nose-like projections 6 radially protrude in the form of opposing pairs.

The projections 6 consist of individual nose stones placed one upon the other and positively bonded to the side reflector 5. The projections 6, which are made of graphite in the same manner as the side reflector, include a plurality of vertically elongated cavities 12. While the core is intended to receive the fuel elements in a known manner (not shown), the vertical cavities 12 serve to contain the absorber elements 7 with the assistance of closure means 20, 30, 40, 50, 60, and 70. The respective configuration of such closure means are described in detail in FIGS. 2–7.

As more clearly depicted in FIGS. 2–7, the nose-like projections terminate in the inner-most extent in a continuous vertically disposed gap which is substantially sealed by means of closure means cooperatively engaged with the portion of the projection which defines the gap.

Figure 2:
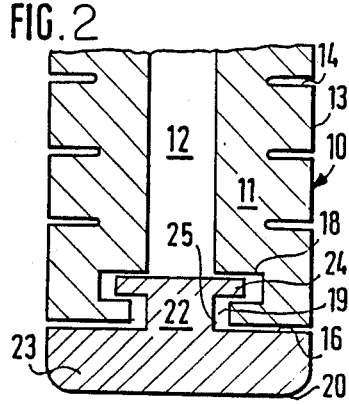
FIG. 2 shows anchoring by means of a square groove in the nose stone.

FIG. 2 shows a horizontal longitudinal section through a nose stone 10, the closure means 20 inserted. The nose stone 10 has two opposing lateral sections 11 parallel to each other and including between them an elongated cavity 12, and within the external surfaces 13 of said sections, spaced apart slit-like grooves 14 being provided for the reduction of residual stresses caused by expansion.

Closure means 20 is placed into the frontal vertical continuous opening 19 formed by the cavity 12, said closure means consisting of an external facing portion 23 and an internal sealing portion 22. Facing portion 23 of the closure means 20 covers the frontal side 16 of the nose stone 10 over its entire width, while the sealing portion 22 is centrally attached to facing portion 23 and positioned in the cavity 12.

At its lateral surface 25 the sealing portion 22 includes projections 24 with a square cross-section, said projections cooperatively engaging corresponding grooves 18 in the lateral sections 11 of the nose stone 10 and positively immobilizing the closure means 20 within the groove 19. The grooves 18 and the projections 24, which should be considered the feathers of a joint, are coordinated dimensionally so that the anchoring created in this manner is adequately mobile and does not induce additional stresses in the nose stone 10.

Figure 3:
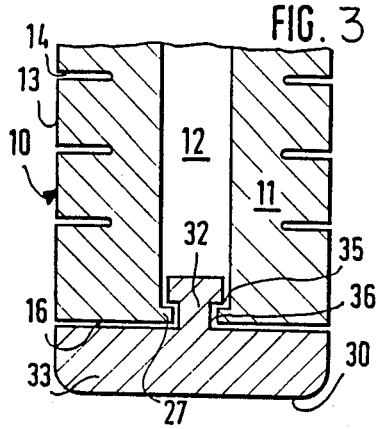
FIG. 3 shows anchoring with a square groove in the closure part.

The view shown in FIG. 3 is largely similar to the layout of FIG. 2. Identical reference symbols therefore indicate identical parts. The configuration of the anchoring means are, however, different. In the design shown in FIG. 3, grooves 36 of a rectangular cross-section are cut into the lateral surfaces 35 of the sealing portion 32 which is centrally attached to the facing portion 33, said grooves being cooperatively engaged by a shoulder 27 extending from the lateral sections 11 of the nose stone 10, thereby anchoring the closure means 30 set into the nose stone 10.

The view shown in FIG. 4 is again identical with the exception of the anchoring means with the layout known from FIG. 2. In contrast to the latter, grooves 38 of a triangular cross-section are cut into the lateral sections 11 of the nose stone 10 beginning at the cavity 12 and extending into the vicinity of the frontal side 16, said grooves 38 again being cooperatively engaged by projections 44 of the sealing portion 42 of the closure means 40 introduced into the cavity 12 and again centrally attached to facing portion 43, thereby securing the closure means 40.

Figure 4:
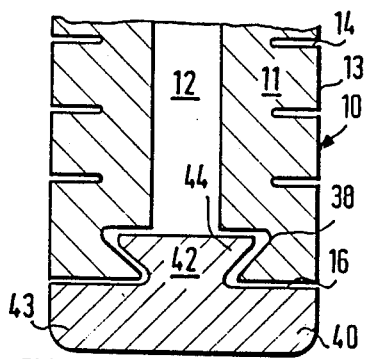
FIG. 4 shows anchoring with a keyway in the nose stone.
Figure 5:
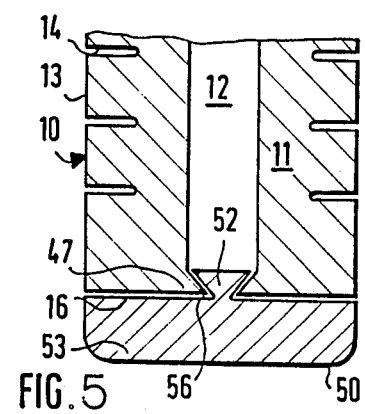
FIG. 5 shows anchoring with a keyway in the closure part.

The variant shown in FIG. 5 differs from the configuration of FIG. 4 in that the lateral sections 11 of the otherwise identical nose stone 10 are equipped on the side bordering the cavity 12 directly with shoulder 47 of a triangular cross-section on the frontal side, said shoulder cooperatively engaging the grooves 56 cut into the sealing portion 52 inserted into the cavity 12 of the closure means 50, thereby anchoring the closure means 50 to the nose stone 10. As in the case of the anchoring means of FIG. 4, adequate mobility of the closure part 50 is assured by the appropriate dimensioning of the grooves and projections.

The configuration shown in FIG. 6 which is again nearly identical with the above-described layout with the exception of the anchoring mechanism employed, comprises on the frontal ends of the lateral sections 11 of the nose stone 12, a plurality of annular segment-shaped, i.e., cylindrical grooves 58, adapted to receive the projections 64 located on the sealing portion 62 of the closure means 60.

The sealing portion, which again is centrally attached to facing portion 63, thereby assures an adequate mobility of the anchoring of the closure means 60 on the nose stone 10.

Figure 6:
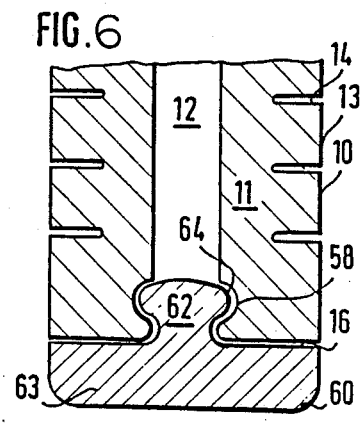
FIG. 6 shows anchoring with a cylindrical groove in the nose stone.
Figure 7:
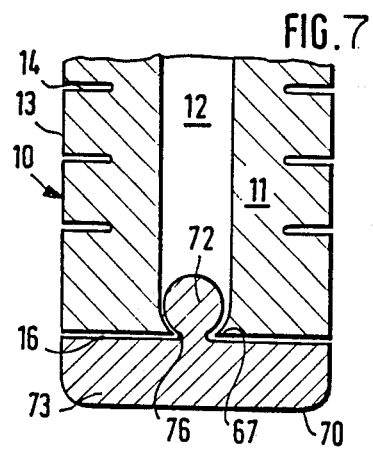
FIG. 7 shows anchoring with a cylindrical column.

In a deviation from the variant shown in FIG. 6, FIG. 7 shows an anchoring mechanism in which the sealing portion 72 is in the form of a semi-cylinder centrally connecting with facing portion 73 and defining with said portion 73 a recess 76. Appropriately curved shoulders 67 protrude from the lateral sections 11 of the nose stone 10 in the vicinity of the frontal side 16 into the cavity 12, while engaging the recess 76.

All of the variants described have in common the extensive, hinge-like mobility of the closure means 20, 30, 40, 50, 60, 70 while providing secure anchoring to safely exclude the possibility of an unintentional release from the nose stone 10, said closure means being relatively lightly retained so that only a slight or small flow of gas is able to pass from inside (from the cavity 12) out or from the outside (from the core of the reactor) in.

In addition, the closure means 20, 30, 40, 50, 60, 70 also acts as a seal, which in case of a difference in pressure between the cavity and the reactor core extensively and automatically prevents pressure equalization by the urging of the closure means against the adjacent surfaces of the projection.

The grid-like pattern configuration of the slit-like grooves 14 on the lateral surfaces 13 of the nose stone 10 is clearly apparent from FIG. 8 showing a side or lateral view of a nose stone 10 with the closure means 20 inserted. The upper and lower parts of the nose stone 10 are shown. They are similar in structure to the center part, which is not shown but is indicated by broken lines.

Facing portion 23 of the closure means 20 is smaller in height than the nose stone. The sealing portion 22 follows with a small stepdown 21. In this manner, a slit-like groove is produced by the stacking of the nose stones 10 upon each other, which makes it possible to reduce the volume changes and the associated residual stresses of the graphite facing portion 23 of the closure means 20 exposed to high neutron fluxes.

In FIG. 9, a side or lateral view of a nose stone 10 with an inserted closure means 20 is shown, the lattr consisting of facing portion 23 and a sealing portion 22. The lateral surfaces 13 of the nose stone 10 comprise a plurality of slit-like grooes 14 arranged in a grid pattern intended to reduce the stresses generated by expansions in the nose stone 10. The sealing portion 22 conforms to the facing portion 23 in alignment. Both are lower in height than the nose stone 10. Supporting cams 26 are provided to establish a gap-like intermediate space between closure means 20 placed upon each other, making it possible to reduce and absorb the volume changes caused by neutron fluxes.

The closure of the nose stone 10 slit on its frontal surface without stress is an essential characteristic of the invention; it prevents the exit of the small absorber material balls located in the nose stone 10 into the core and their intermixing with the fuel elements therein. The entry of fuel elements through the opening into the cavity 12 is also prevented, as such an entry would render the shutdown system consisting of the small absorber material balls ineffective.

What is claimed is:

1. In combination with a gas-cooled high temperature reactor having a reactor core filled with spherical fuel elements,
   a graphite side reflector comprising at least one nose-like projection protruding radially into the reactor core from said graphite side reflector,
   said at least one nose-like projection comprising a vertically disposed cavity adapted to receive discrete absorber material elements and a vertically disposed continuous opening which permits communication between said cavity and the reactor core, and
   sealing means positioned in said continuous opening and positively engaged with a portion of said nose-like projection which defines said vertically disposed continuous opening, said sealing means being so configured and so positively engaged by cooperating surfaces in said projection so as to permit gaseous communication between said cavity and said core while preventing passage of said discrete absorber material elements through said continuous opening.

2. The combination according to claim 1, wherein said at least one nose-like projection comprises a plurality of graphite nose stones stacked one upon the other, said nose stones each including a vertically disposed continuous opening aligned with the vertically disposed continuous opening in adjacent nose stones.

3. The combination according to claim 2, wherein said sealing means is columnar in form and cooperatively engages each of said nose stones.

4. The combination according to claim 2, wherein said sealing means comprises a plurality of discrete sealing elements cooperatively engaged with corresponding nose stones and stacked one upon the other.

5. The combination according to claim 1, wherein said sealing means is comprised of graphite.

6. The combination according to claim 1, wherein said sealing means is cooperatively engaged with said nose-like projection by means of a tongue and groove connection.

7. The combination according to claim 1, wherein said sealing means is cooperatively engaged with said nose-like projection by means of a T-shaped member cooperatively engaged with correspondingly-shaped grooves in said projection.

8. The combination according to claim 1, wherein said sealing means is cooperatively engaged with said nose-like projection by means of an oval-shaped member cooperatively engaged with correspondingly-shaped grooves in said projection.

9. The combination according to claim 1, wherein said sealing means is cooperatively engaged with said nose-like projection by means of a T-shaped member cooperatively engaged with a corresponding shoulder portion in said projection.

10. The combination according to claim 1, wherein said sealing means is cooperatively engaged with said nose-like projection by means of a triangular-shaped member cooperatively engaged with correspondingly-shaped grooves in said projection.

11. The combination according to claim 1, wherein said sealing means is cooperatively engaged with said nose-like projection by means of a triangular-shaped member cooperatively engaged with a corresponding shoulder portion in said projection.

12. The combination according to claim 1, wherein said sealing means is cooperatively engaged with, said nose-like projection by means of a member having a circular surface cooperatively engaged with a corresponding shoulder portion in said projection.

13. The combination according to claim 1, comprising at least two nose-like projections uniformly positioned around the circumference of the reactor.

14. The combination according to claim 9, comprising four nose-like projections uniformly positioned around the circumference of the reactor in the form of opposing pairs aligned along a common axis.

15. The combination according to claim 1, wherein said vertically disposed continuous opening is centrally-disposed in the frontmost portion of said nose-like projection in relation to the core of the reactor.

16. The combination according to claim 1, wherein said at least one nose-like projection includes a plurality of slit-like grooves in the exterior surface thereof.

17. The combination according to claim 1, wherein said sealing means comprises a facing portion having a lateral dimension corresponding to the lateral dimension of the frontmost portion of said nose-like projection adjacent said vertically-disposed continuous opening.

* * * * *